United States Patent
Yokota

(10) Patent No.: US 8,810,790 B2
(45) Date of Patent: Aug. 19, 2014

(54) SPECTROMETER WITH WAVE GEAR DEVICE TO REDUCE ROTATION OF MOTOR FOR EXTRACTING MONOCHROMATIC LIGHT OF SPECIFIC WAVELENGTH

(75) Inventor: Kazumi Yokota, Mishima (JP)

(73) Assignee: Shimadzu Corporation, Kyoto-Shi (JP)

( * ) Notice: Subject to any disclaimer, the term of this patent is extended or adjusted under 35 U.S.C. 154(b) by 288 days.

(21) Appl. No.: 13/171,232

(22) Filed: Jun. 28, 2011

(65) Prior Publication Data

US 2012/0002200 A1 Jan. 5, 2012

(30) Foreign Application Priority Data

Jul. 2, 2010 (JP) ................................. 2010-151717

(51) Int. Cl.
*G01J 3/28* (2006.01)
*G01J 3/32* (2006.01)
*G01J 3/18* (2006.01)
*G01J 3/02* (2006.01)

(52) U.S. Cl.
CPC .................. *G01J 3/0202* (2013.01); *G01J 3/32* (2013.01); *G01J 3/18* (2013.01)
USPC ........................................................ 356/326

(58) Field of Classification Search
CPC ........................................................ G01J 3/0202
USPC .................................................. 356/300–328
See application file for complete search history.

(56) References Cited

U.S. PATENT DOCUMENTS

| 4,664,522 A | * | 5/1987 | LeFebre | 356/328 |
| 4,776,708 A | * | 10/1988 | Carlson | 384/447 |
| 4,971,439 A | * | 11/1990 | Brown | 356/319 |
| 6,452,674 B1 | * | 9/2002 | Fujiyoshi | 356/328 |
| 7,072,037 B2 | * | 7/2006 | Harada | 356/333 |
| 2004/0090624 A1 | * | 5/2004 | Yokota et al. | 356/328 |

FOREIGN PATENT DOCUMENTS

JP 2005-098910 A 4/2005

OTHER PUBLICATIONS

Chinese Office Action mailed Jul. 29, 2013 for corresponding Chinese Patent App. No. 201110192349.6.

* cited by examiner

*Primary Examiner* — Kara E Geisel
*Assistant Examiner* — Maurice Smith
(74) *Attorney, Agent, or Firm* — Bingham McCutchen LLP

(57) ABSTRACT

A spectrometer has a motor, a reduction means for employing a wave gear device to reduce the rotation of the motor, a wavelength dispersion device for being driven by rotation that was reduced by the reduction means, and a control means for controlling the operation of the motor. When changing the wavelength of light that is extracted from the spectrometer, the control means controls the motor so that an input shaft of the wave gear device is rotated by 180° or more before the input shaft is positioned at an angular position that corresponds to the target wavelength.

5 Claims, 4 Drawing Sheets

SPECTROMETER WITH WAVE GEAR DEVICE TO REDUCE ROTATION OF MOTOR FOR EXTRACTING MONOCHROMATIC LIGHT OF SPECIFIC WAVELENGTH

FIELD OF THE ART

The present invention relates to a spectrometer used in spectrophotometers and the like for extracting monochromatic light of a specific wavelength.

BACKGROUND ART

Spectrophotometers—such as ultraviolet and visible spectrophotometers and atomic absorption spectrophotometers—use spectrometers (monochromators) to obtain monochromatic light of a predetermined wavelength. The typical configuration of a spectrometer is to include a diffraction grating (wavelength dispersion device) and a rotational driving mechanism for changing the angle of light that is incident to the wavelength dispersion device. With a spectrometer such as the afore-described, light that is chromatically dispersed by the diffraction grating passes through an exit slit whose position is fixed to extract monochromatic light of a predetermined wavelength. The wavelength of the monochromatic light that is extracted is changed by rotating the diffraction grating by means of the rotational driving mechanism. Therefore, the accuracy of the wavelength of the monochromatic light is strongly dependent on the angular accuracy of the diffraction grating. Increasing the accuracy of the wavelength requires a rotational driving mechanism that can rotationally drive the diffraction grating with a very fine pitch and accuracy.

Previously known in the art is a rotational driving mechanism that uses a sine bar mechanism. Others have proposed rotational driving mechanisms that use a wave gear device which is a type of reduction gear (see for example Patent Literature 1).

As FIG. 5 shows, a wave gear device—also known as a harmonic drive (registered trademark)—comprises a wave generator 71 which is a cam-shaped oval component that is coupled to an input shaft 75, a cup-shaped elastic gear (flex spline) 73 that is installed on the outer periphery of the wave generator via bearings 7, and a cylindrical rigid gear (circular spline) 74.

Rigid gear 74 has a circular cross-sectional shape, and the elastic gear 73 is flexed into an oval cross-section by the wave generator 71. This results in the gear teeth on the inner peripheral surface of the rigid gear 74 and the gear teeth on the outer peripheral surface of the elastic gear 73 to mesh with each other at only two locations located close to the major axis of the oval-shaped wave generator 71 and to be completely separated from each other near the minor axis.

If the rotation of a motor is transmitted to the wave generator 71 via the input shaft 75 while the rigid gear 74 is fixed, the elastic gear 73 elastically deforms with the rotation of the wave generator 71 and the meshing position with the rigid gear 74 sequentially moves. The number of gear teeth that is disposed on the elastic gear 73 is less by 2 than the number of gear teeth that is disposed on the rigid gear 74. This means that during one rotation of the wave generator 71, the elastic gear 73 rotates in the opposite direction by two gear teeth. The rotation of the elastic gear 73 is extracted as an output and is transmitted to the diffraction grating.

With a wave gear device, the common practice is to fix the rigid gear 74 as afore-described and to extract the rotation of the elastic gear 73 as an output as afore-described. It is also possible to fix the elastic gear 73 and extract the rotation of the rigid gear 74 as an output.

PREVIOUS TECHNICAL LITERATURE

Patent Literature

Patent Literature 1: Unexamined Patent Application Publication No. 2005-098910

OVERVIEW OF THE INVENTION

Problems to be Solved by the Invention

A wave gear device is a good reduction gear for obtaining a large reduction ratio. However, because elastic deformation is used to feed the gears, when a gear is kept stationary at a specific position, strain accumulates in the elastic gear, and angular errors are created. However, since the angular errors that result are minor, the impact of the angular error on the accuracy of the wavelength in previous spectrometers could be ignored.

However, there has been a need in recent years for greater accuracy and higher resolution in analyses performed using spectrophotometers and the like. This has created a need to improve the angular accuracy of the rotational driving mechanism including the aforesaid wave gear device.

The present invention was made in light of the afore-described points, and it is the object of the present invention to provide a spectrometer that employs a wave gear device as a rotation reduction gear that can extract monochromatic light with a greater wavelength accuracy.

Means for Solving the Problems

The spectrometer according to the present invention that was invented to solve the afore-described problems comprises:
a) a motor;
b) a reduction means that employs a wave gear device for reducing the rotation of the motor;
c) a wavelength dispersion device that is driven by a reduced rotation achieved by the reduction means; and
d) a control means for controlling the operation of the motor.

To change the wavelength of the light that is extracted from the spectrometer, the control means controls the motor to rotate the input shaft of the wave gear device by 180° or more before the input shaft is positioned at an angular position that corresponds to the target wavelength.

By performing the above control, during the time that the wavelength that is extracted from the spectrometer is moved from the current wavelength position to the target wavelength position, the wave generator of the wave gear device is rotated by 180° or more, thereby eliminating the strain that is created in the elastic gear, preventing the generation of angular errors caused by the accumulation of strain, and achieving a high level of wavelength reproducibility. Since the wave generator has an oval cross-section and a 180° symmetry about the input shaft, strain in the elastic gear can be eliminated by a rotation of 180° or more. However, since the shape of the wave generator is not strictly perfectly symmetrical, it is desirable to rotate by 360° or more.

With the spectrometer according to the present invention, it is desirable, when changing the wavelength, for the control means to control the motor so that the input shaft of the wave gear device is rotated to a predetermined reference angular position, stopped there once, and then positioned at an angular position that corresponds to the target wavelength.

When changing the wavelength, by always first positioning the input shaft at a reference angular position and then positioning the input shaft at an angular position that corresponds to the target wavelength, the same amount of strain would be present in the elastic gear whenever the input shaft is begun to be rotated to the angular position that corresponds to the target wavelength. This further increases the positioning reproducibility involved in changing the wavelength.

Effects of the Invention

As afore-described, with the spectrometer according to the present invention, angular errors arising from strain in the elastic gear of a wave gear device are prevented, and monochromatic light can be extracted with a greater wavelength accuracy than previously.

BRIEF DESCRIPTION OF THE FIGURES

FIG. 3 shows the results of repeated measurements taken using a spectrophotometer having an embodiment of the spectrometer.

EMBODIMENTS

Figure 1:
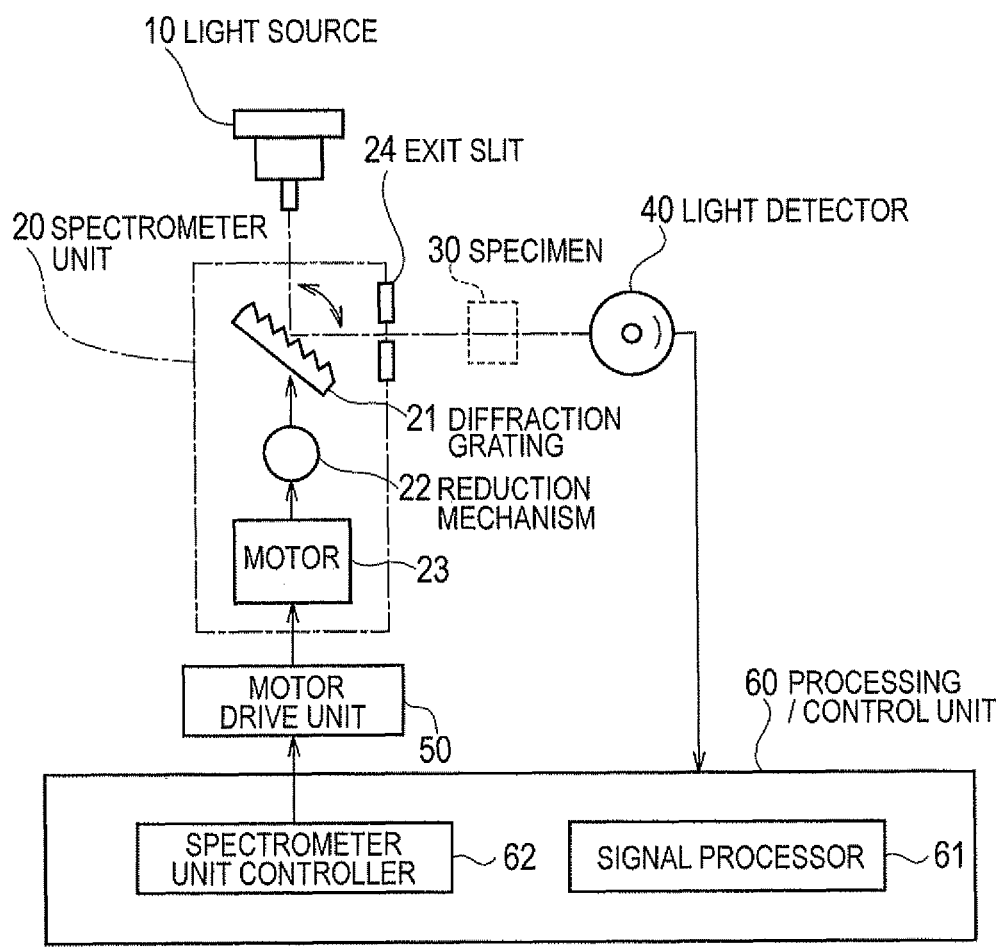
FIG. 1 shows the configuration of the major components of a spectrophotometer that uses one embodiment of a spectrometer according to the present invention.

One embodiment of a spectrometer according to the present invention is described next with reference to the figures. FIG. 1 shows a schematic view of a spectrophotometer that includes a spectrometer according to the present embodiment.

In FIG. 1, light that is emitted from light source 10 is a light of broad spectrum or a plurality of wavelengths. One of the wavelengths is selected and extracted as monochromatic light by the spectrometer unit 20. The spectrometer unit 20 includes: a diffraction grating 21 that rotates over a predetermined angular range; a motor (e.g., a stepping motor) 23 that serves as a rotational drive source; a reduction gear mechanism 22 that uses a wave gear device that rotationally drives the diffraction grating 21 by reducing the rotation of the motor shaft using a predetermined reduction ratio; and an exit slit 24 for extracting to the outside a portion of the light that was chromatically dispersed by the diffraction grating 21. Monochromatic light that is extracted by the spectrometer unit 20 is directed at specimen 30. The light that is reflected by or passes through specimen 30 is provided to the light detector 40 which outputs a detection signal that corresponds to the intensity of the light. The detection signal is input to signal processor 61 in the processing/control unit 60 where a predetermined computation is performed to calculate such things as absorbance and reflectance.

In addition to the signal processor 61, the processing/control unit 60 includes a spectrometer unit controller 62. Based on the target wavelength that is provided to the spectrometer unit controller 62, the spectrometer unit controller 62 performs a predetermined process described below. Based on the results of the predetermined process, processing/control unit 60 controls the motor 23 via the motor drive unit 50. With this example, the spectrometer unit 20, motor drive unit 50 and the spectrometer unit controller 62 form the equivalent of a spectrometer according to the present invention. A personal computer that includes a CPU, RAM, hard disk and the like may be used as the processing/control unit 60. The functions of the signal processor 61 and the spectrometer unit controller 62 are realized by running a predetermined processing/control program that is installed on the personal computer.

Figure 5:
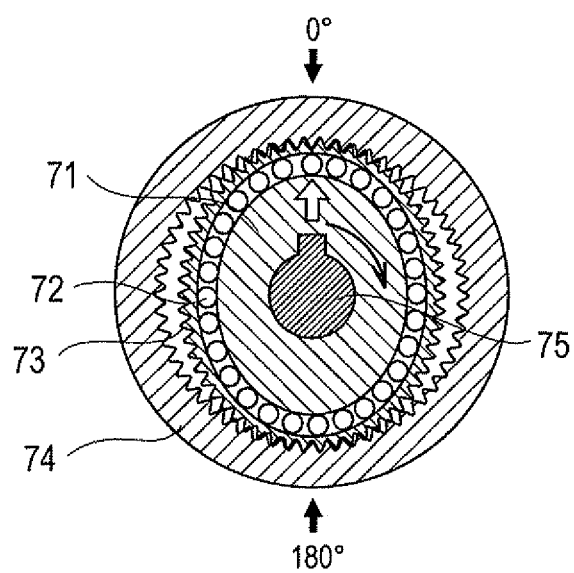
FIG. 5 shows a sectional view of the configuration of a wave gear device.

The wave gear device that constitutes the reduction mechanism 22 has the same configuration as that shown in FIG. 5. To explain, with the spectrometer unit 20 with the afore-described configuration, the rotation of motor 23 is transmitted to wave generator 71 via input shaft 75 and rotationally drives the wave generator 71. Light of a wavelength that corresponds to the rotational angle is extracted through exit slit 24.

The spectrophotometer according to the present embodiment is characterized by the operation that is involved in changing the wavelength ("extraction wavelength") of the light that is extracted from the spectrometer unit 20 by the rotational driving of the wave generator 71 as afore-described. The operation involved in changing the wavelength is described next.

When a target wavelength is set for extraction from the spectrometer unit 20, the spectrometer unit controller 62 determines the operation required in changing the extraction wavelength from the current wavelength position ("initial wavelength position") to the target wavelength position ("target wavelength position"). When determining the operation, the operation is determined so that the wave generator 71 is rotated by 180° or more, preferably 360° or more, while moving from the initial wavelength position to the target wavelength position. (This is referred to as "operation condition 1.") This eliminates the strain that is created in the elastic gear 73, prevents the generation of angular errors caused by the accumulation of strain and achieves a high level of wavelength reproducibility.

For example, if the rotational angle of the wave generator 71 under operation condition 1 is set to 360° or more but the rotational angle of the wave generator 71 would be less than 360° if the extraction wavelength is directly moved from the initial wavelength position to the target wavelength position, the wave generator 71 is rotated by 360° or more and the extraction wavelength is temporarily moved from the initial wavelength position to an optional wavelength position. The wave generator 71 is rotated in an opposite direction as before to move to the target wavelength position. Alternatively, after rotating the wave generator 71 to move the extraction wavelength from the initial wavelength position to an optional wavelength position, the wave generator 71 is rotated in an opposite direction by 360° or more to arrive at the target wavelength position.

When changing the wavelength as afore-described, it is desirable to temporarily stop the wave generator 71 at a predetermined angular position ("reference angular position") and to then rotate to the angular position that corresponds to the target wavelength position. (This is referred to as "operation condition 2.") By first positioning the wave generator 71 at the same angular position every time before rotating to the angular position that corresponds to the target wavelength position, the amount of strain in the elastic gear 73 immediately before moving to the target wavelength position becomes always the same. This further enhances the reproducibility of the positioning associated with a change in wavelength.

As afore-described, when the extraction wavelength is moved from the initial wavelength position to the target wavelength position via an optional wavelength position (including the wavelength position corresponding to the aforesaid reference angular position; same hereinafter), the rotation of the wave generator 71 by 180° or more (or 360° or more) may be performed when moving from the initial wavelength position to an optional wavelength position, but it is desirable to do this when moving from the optional wavelength position to the target wavelength position. (This is referred to as "operation condition 3.") This allows the strain in the elastic gear 73 to be eliminated in an operation immediately before arriving at the target wavelength position, further increasing the wavelength reproducibility. Furthermore, even more desirable is to perform the afore-described rotation by 180° or more (or 360° or more) before both when moving from the initial wavelength position to an optional wavelength position and when moving from the optional wavelength position to the target wavelength position. (This is referred to as "operation condition 4.")

When the operation for changing the wavelength is decided, the spectrometer unit controller 62 decides the rotation angle, rotation direction, and rotation sequence for motor 23 required for realizing the operation. The motor 23 is controlled accordingly. A conversion means such as a conversion table or a conversion equation representing the relationship between rotation angle and the number of pulses to be provided to motor 23 is provided in advance in the spectrometer unit controller 62. This conversion means is used to calculate the number of pulses based on the rotation angle. A pulse signal representing the number of pulses that was calculated is sent to motor 23 via the motor drive unit 50 and is used as a basis for the rotation of the motor 23. The motor's rotation that is reduced by reduction mechanism 22 rotates the diffraction grating 21. In this way, the diffraction grating 21 is precisely set at an angle that allows monochromatic light having the target wavelength to be extracted.

Figure 2:
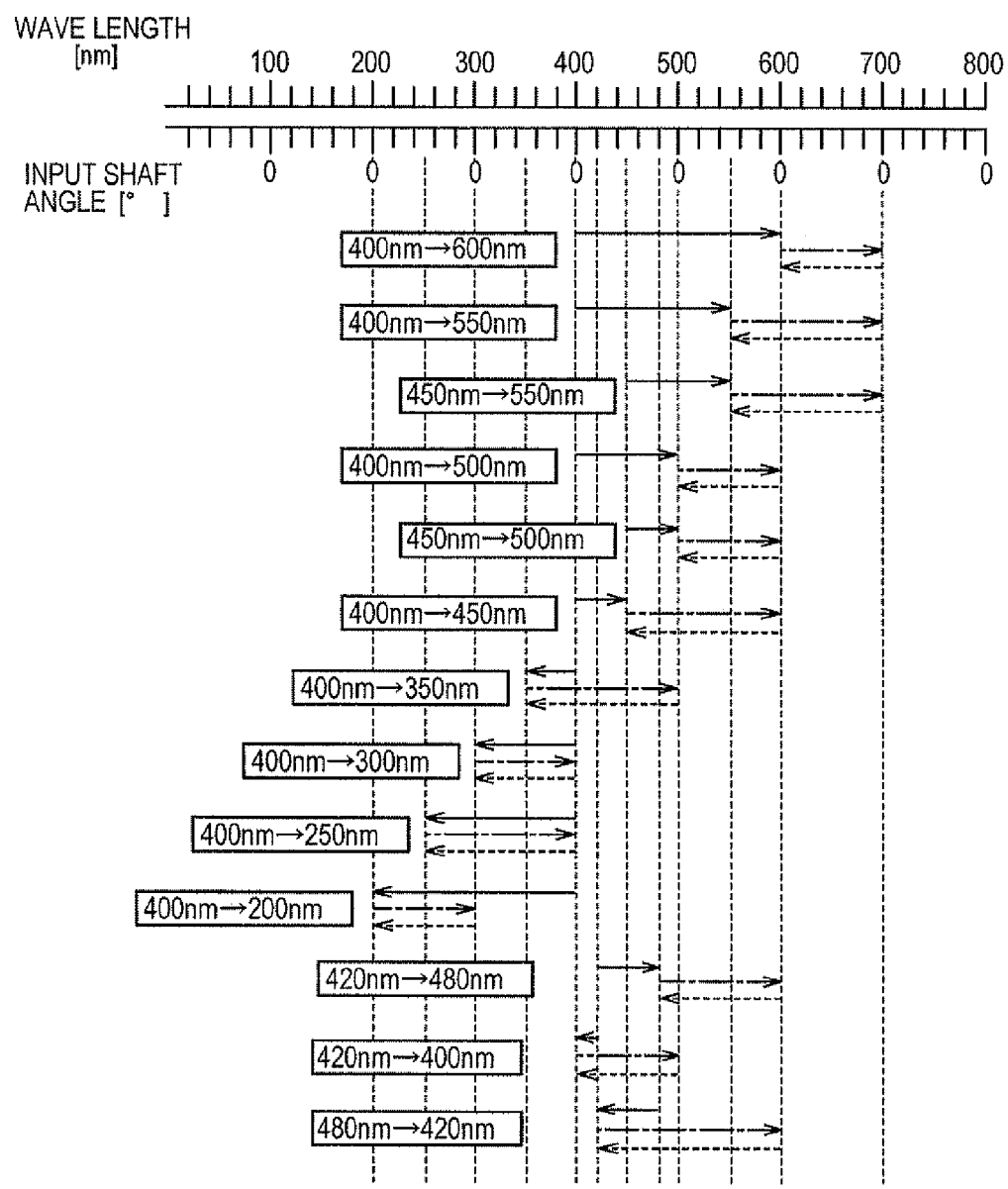
FIG. 2 shows the operation of the above embodiment of the spectrometer.

The operation involved in a specific example of changing the wavelength with the present embodiment is described next with reference to FIG. 2. Since it is a common practice with spectrophotometers to scan the wavelength from the long wavelength side to the short wavelength side, the present example shows the case where the target wavelength position is decided starting from the long wavelength side.

Here, a stepping motor with a specification of 0.36°/full step is used as the motor 23. It is assumed here that the optical system is set considering the reduction ratio so that one full step of the motor 23 corresponds to an extraction wavelength of 0.1 nm. Furthermore, to simplify the description, it is assumed that there is a simple proportional relationship between wavelength and the number of pulses of the motor. Still furthermore, as FIG. 2 shows, the angle (input shaft angle in the figure) of the wave generator 71 that corresponds to an extraction wavelength of 100 nm is set to be 0°. This means that during the time that the input shaft rotates by one rotation (360° rotation) in a clockwise direction and wave generator 71 returns again to the 0° position, the extraction wavelength shifts to the long wavelength side by 100 nm.

Furthermore, with the present example, the angular relationship between rigid gear 74 and wave generator 71 shown in FIG. 5 is defined as an angular position of 0° and is used as the reference angular position. In other words, the positions shown in FIG. 2 such as 100 nm, 200 nm, 300 nm and the like represent the wavelength positions corresponding to the reference angular position. Hereinafter, the wavelength position corresponding to the reference angular position is referred to as the reference wavelength position.

The operations involved in changing the extraction wavelength from 420 nm to 480 nm are described first. In this case, the initial wavelength position is 420 nm, and the target wavelength position is 480 nm. The angular position of wave generator 71 corresponding to 420 nm is 72°, and the angular position corresponding to 480 nm is 288°. Assume that the extraction wavelength is directly moved from 420 nm to 480 nm, a shift in wavelength of 60 nm. The corresponding rotation of the wave generator 71 would only be 216°, meaning that the strain in the elastic gear 73 would not be completely eliminated. Therefore, with the present embodiment, the wave generator 71 is first rotated from the 72° position corresponding to the initial wavelength position by 360° or more and is then rotated in the opposite direction to the 288° position which corresponds to the target wavelength position. However, the wavelength position corresponding to a 360° clockwise rotation of wave generator 71 from the 72° position corresponding to the initial wavelength position is 520 nm which is not a reference wavelength position mentioned above. Therefore, as shown in FIG. 2, it is preferable to move the extraction wavelength to the next reference wavelength position of 600 nm and to then move to the target wavelength position of 480 nm.

Even if a direct movement is made from the initial wavelength position to the target wavelength position to change the extraction wavelength from 400 nm to 600 nm, the wave generator 71 will rotate by 360° or more. However, since, with the present example, the positioning at the target wavelength position is performed from the long wavelength side, the movement involves, as shown in FIG. 2, moving from the 400 nm position to the 700 nm position—which is a reference wavelength position—past the target wavelength position of 600 nm, and then moving from the 700 nm position to the target wavelength position.

Similarly, when changing the extraction wavelength from 400 nm to 550 nm, if the extraction wavelength is directly moved from the initial wavelength position to the target wavelength position, the wave generator 71 will rotate by 360° or more. However, since, with this example, the positioning is done from the long wavelength side, the extraction wavelength is first moved from the target wavelength position to a reference wavelength position that is on the long wavelength side and a movement is then made from there to the target wavelength position. When doing this, even though it is possible to position at the closest reference wavelength position of 600 nm, since it is preferable to rotate the wave generator 71 by 360° or more even when moving from the reference wavelength position to the target wavelength position, the extraction wavelength is first moved to the reference wavelength position of 700 nm and a movement is made to the target wavelength position of 550 nm as shown in FIG. 2.

To change the extraction wavelength from 400 nm to 250 nm, a direct movement from the initial wavelength position to the target wavelength position would cause the wave generator 71 to rotate by 360° or more and the positioning to be done from the long wavelength side. However, since it is desirable for the wave generator 71 to rotate twice or more by 360° during the time that the wavelength is being changed, what is done here is to first move the extraction wavelength to the 250 nm position which is the target wavelength position, then rotate the wave generator 71 clockwise by 360° or more to a reference wavelength position (400 nm position) that is on the long wavelength side of the target wavelength position, and then move again to the target wavelength position of 250 nm, as shown in FIG. 2.

The operations involved in changing the wavelength for the example shown in FIG. 2 can be summarized as follows.
(1) First, the extraction wavelength is moved from the initial wavelength position to the target wavelength position (the arrow depicted by a solid line in FIG. 2).
(2) The wave generator 71 is rotated by 360° or more so that the extraction wavelength moves to a reference wavelength position on the long wavelength side of the target wavelength position (the arrow depicted by an alternating long and short dashed line in FIG. 2).
(3) The extraction wavelength is then moved from the reference wavelength position to the target wavelength position (the arrow depicted by a dashed line in FIG. 2).

This operation satisfies the afore-described operation conditions 1 through 4 and prevents shifts in wavelength caused by angular errors of the wave gear device and improves wavelength reproducibility. If the target wavelength position is located on the long wavelength side of the initial wavelength position, the rotation direction of the wave generator 71 for (1) and (2) above would be the same, allowing these two steps to be executed continuously (i.e., without stopping the rotation of the wave generator 71). Also, with the operation example shown in FIG. 2, the reference angular position was set to 0° but other angular positions may be used as well.

Figure 3A:
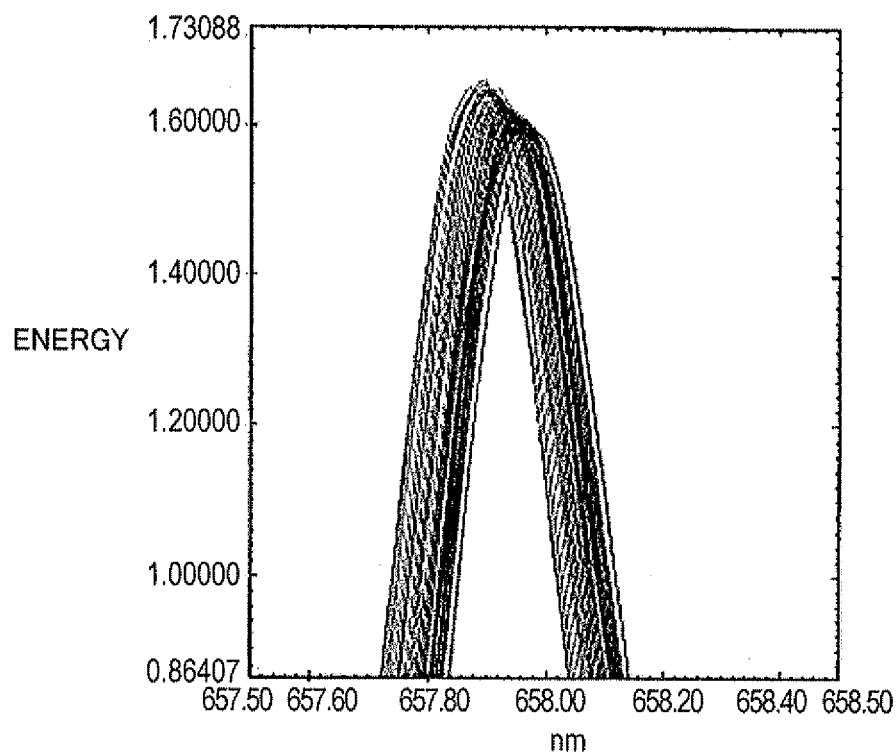
FIG. 3(a) shows the results of the operations performed using operation condition 1.
Figure 3B:
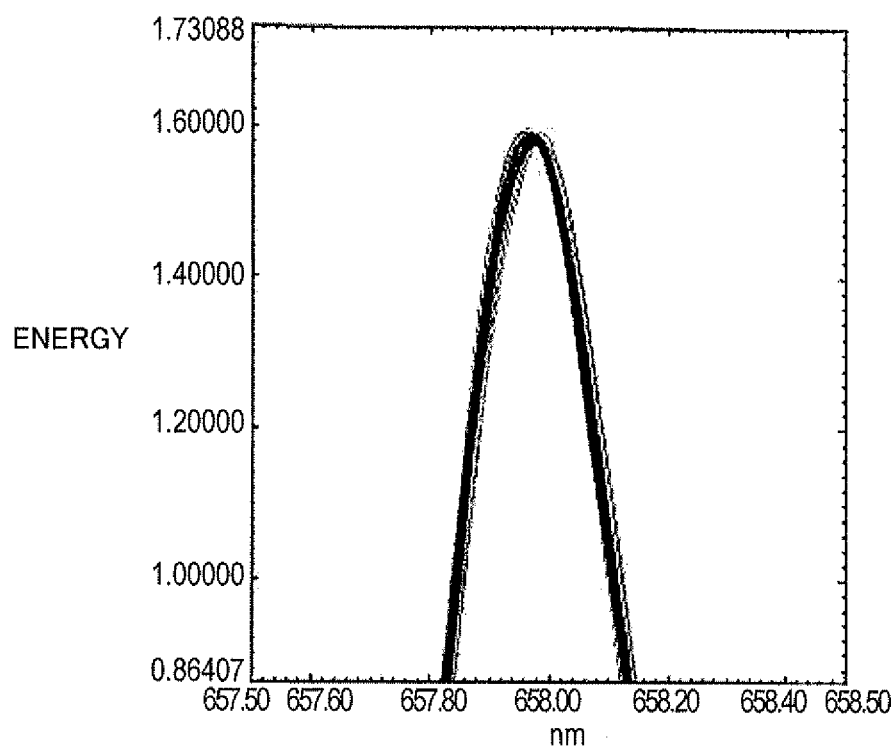
FIG. 3(b) shows the results of the operations performed using operation conditions 1 and 2.
Figure 4:
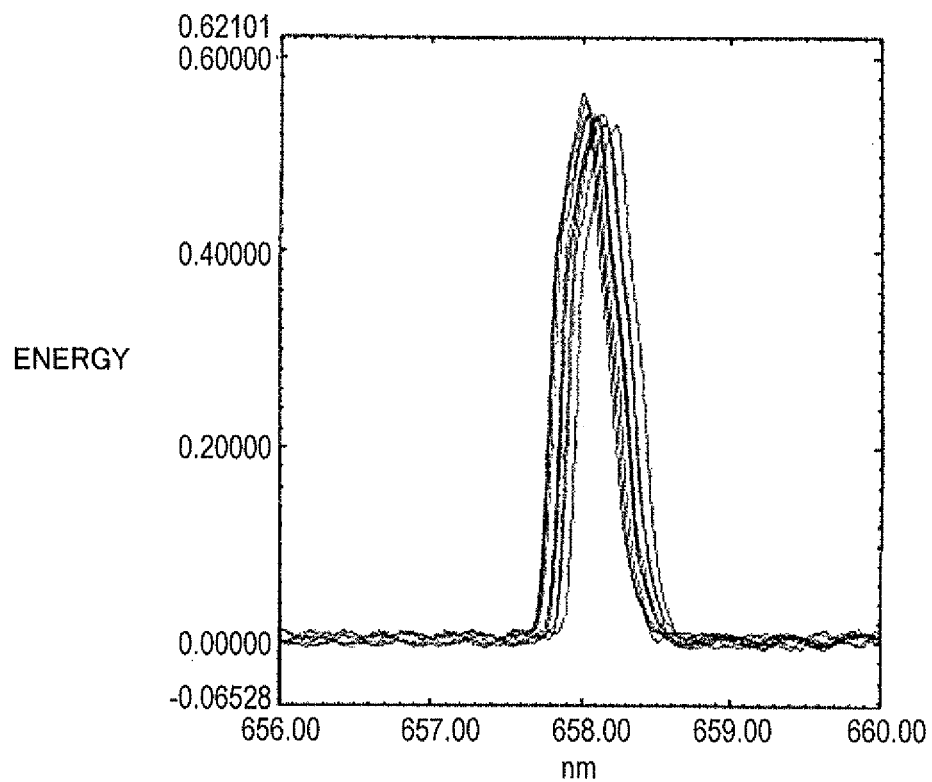
FIG. 4 shows the results of repeated measurements obtained with a spectrophotometer having a previous spectrometer.

FIG. 3 shows the results of repeated measurements performed using a spectrophotometer having a spectrometer according to the present embodiment. FIG. 4 shows the results of repeated measurements performed using a spectrophotometer having a spectrometer of the previous type. The measurements involved repeatedly performing a wavelength scan over a predetermined wavelength range while measuring the bright line spectrum (656.1 nm) of a deuterium lamp using a slit with a width of 2 nm. Specifically, the extraction wavelength is first positioned at the long wavelength side of the wavelength range. Scanning is then performed toward the short wavelength side of the wavelength range using a predetermined pitch. After one scan is completed, a wavelength scan is repeated after returning to the position on the long wavelength side in the wavelength range. This was repeated 100 times. FIG. 4 shows the results obtained when the extraction wavelength was directly moved from the short wavelength side to the long wavelength side in the wavelength range after each scan was completed. FIG. 3(a) shows the results for the operation performed in accordance with the afore-described operation condition 1. FIG. 3(b) shows the results for the operation performed in accordance with the afore-described operation conditions 1 and 2.

In FIG. 3 and FIG. 4, the peak energy values differ depending on the measurement timing. Since no calibration was performed on the device for wavelength accuracy, the peak wavelength in FIG. 3 and FIG. 4 deviates from the position of the bright line spectrum (656.1 nm) of the deuterium lamp. However, since the purpose of these measurements is to improve wavelength reproducibility, the peak energy value or the absolute wavelength accuracy is not at issue here.

As these figures show, the deviation in peak wavelength is approximately 0.12 nm in FIG. 3(a), 0.02 nm in FIG. 3(b) and 0.22 nm in FIG. 4, confirming that the use of a spectrometer according to the present invention improves wavelength reproducibility over previous spectrometers. Furthermore, by using operation condition 2 in addition to operation condition 1, the deviation in wavelength is even further suppressed and wavelength reproducibility is further improved as compared to the use of operation condition 1 alone.

The present invention was described in terms of the afore-described embodiment. However, the present invention is not limited to the afore-described embodiment, and various modifications are possible without deviating from the scope of the present invention. For example, the afore-described embodiment provided an example of the use of a spectrometer according to the present invention in a spectrophotometer, but the present invention can be generally used in devices that measure bright lines. For example, the present invention can be suitably used in energy dispersive X-ray fluorescence spectrometers and the like.

DESCRIPTION OF THE NUMERICAL REFERENCES

10. Light source
20. Spectrometer unit
21. Diffraction grating
22. Reduction mechanism
23. Motor
24. Exit slit
30. Specimen
40. Light detector
50. Motor drive unit
60. Processing/control unit
61. Signal processor
62. Spectrometer unit controller
71. Wave generator
72. Bearing
73. Elastic gear
74. Rigid gear
75. Input shaft

What is claimed is:

1. A spectrometer comprising:
    a motor;
    a wave gear device for reducing the rotation of said motor;
    a wavelength dispersion device for being driven by a reduced rotation achieved by said wave gear device; and
    a control means for controlling the operation of said motor,
    wherein to change the wavelength of light that is extracted from the spectrometer, said control means controls said motor to rotate an input shaft of said wave gear device by 180° or more before said input shaft is positioned at an angular position that corresponds to the target wavelength.

2. The spectrometer according to claim 1 wherein said rotation by 180° or more is a rotation by 360° or more.

3. The spectrometer according to claim 1 or 2 wherein, when changing said wavelength, said control means control said motor so that the input shaft of said wave gear device is rotated to a predetermined reference angular position, stopped there once, and then positioned at an angular position that corresponds to said target wavelength.

4. A spectrometer comprising:
    a motor;
    a wave gear device for reducing the rotation of said motor;
    a wavelength dispersion device for being driven by a reduced rotation achieved by said wave gear device; and
    a control means for controlling the operation of said motor,
    wherein to change the wavelength of light that is extracted from the spectrometer, said control means controls said motor to rotate an input shaft of said wave gear device by 180° or more before said input shaft is positioned at an angular position that corresponds to the target wavelength, and
    wherein, when changing said wavelength, said control means control said motor so that the input shaft of said wave gear device is rotated to a predetermined reference angular position, stopped there once, and then positioned at an angular position that corresponds to said target wavelength.

5. A spectrometer comprising:
- a motor;
- a wave gear device for reducing the rotation of said motor;
- a wavelength dispersion device for being driven by a reduced rotation achieved by said wave gear device; and
- a control means for controlling the operation of said motor,
- wherein to change the wavelength of light that is extracted from the spectrometer, said control means controls said motor to rotate an input shaft of said wave gear device by 180° or more before said input shaft is positioned at an angular position that corresponds to the target wavelength,
- wherein said rotation by 180° or more is a rotation by 360° or more, and
- wherein, when changing said wavelength, said control means control said motor so that the input shaft of said wave gear device is rotated to a predetermined reference angular position, stopped there once, and then positioned at an angular position that corresponds to said target wavelength.

* * * * *